INVENTORS
John R. Parsons &
Edward C. Hartwig.
ATTORNEY

May 23, 1950  J. R. PARSONS ET AL  2,508,467
LOW-FREQUENCY SEAM TIMER
Filed Sept. 30, 1948  5 Sheets-Sheet 3

Fig. 3.

WITNESSES:
Robert C Baird

INVENTORS
John R. Parsons &
Edward C. Hartwig.
BY
Hymen Diamond
ATTORNEY

Fig. 5.

Patented May 23, 1950

2,508,467

UNITED STATES PATENT OFFICE 2,508,467

LOW-FREQUENCY SEAM TIMER

John R. Parsons and Edward C. Hartwig, Buffalo, N. Y., assignors to Westinghouse Electric Corporation, East Pittsburgh, Pa., a corporation of Pennsylvania Application September 30, 1948, Serial No. 52,105

5 Claims. (Cl. 315—250)

Our invention relates to electric discharge apparatus and it has particular relation to resistance welding apparatus.

The subject matter of this application is the outgrowth of a program under which apparatus for supplying current to weld material at a frequency substantially lower than commercial frequency was developed. The following applications are also an outgrowth of this program and relate closely to the present application:

An application for Welding apparatus, Serial No. 18,699, filed April 2, 1948, to John R. Parsons; an application for Electronic sequence timer, Serial No. 47,812, filed September 4, 1948, to Edward C. Hartwig; an application for Frequency control system, Serial No. 52,103, filed September 30, 1948, to John R. Parsons; and an application for Low frequency control for welding, Serial No. 52,104, filed September 30, 1948, to John R. Parsons and Clarence B. Stadum.

In the second of the above listed applications, a timer is disclosed. While the apparatus disclosed in the other applications has general purposes, it is primarily conceived for producing spot welds of predetermined duration by transmitting alternating current of a frequency substantially lower than commercial frequency through the material to be welded. The welding systems disclosed in the latter applications embody certain of the features of the timer.

The spot welding apparatus disclosed in the above listed applications includes a system for converting commercial frequency alternating current to the lower frequency. Each of the spot welding operations performed with this apparatus is an independent operation involving several steps. The electrodes are first engaged with the material to be welded during a so-called "Squeeze" interval; next the welding current is transmitted through the material during the "weld" interval; thereafter the electrodes are held in engagement with the material until it cools during a so-called "hold" interval; finally the electrodes are disengaged from the material and are reset for a second operation during a so-called "off" interval. To time these steps, a sequence timer is also included in the spot welding apparatus. The timer is closely tied up with the converting system and the welding mechanisms.

Since the low frequency spot welding apparatus was developed, a demand has arisen for low frequency seam welding apparatus. A seam welding system differs radically from a spot welding system. In producing a seam weld, the several steps of a spot welding operation are not involved. The welding electrodes are in the form of rollers between which the material is moved. Once the electrodes are engaged with the material to be welded, they are maintained in engagement and the material moves continuously between them. The welding current is transmitted through the rollers and the material as a series of pulses. The welding current is turned on for a predetermined "on" interval and is maintained off during a second "off" interval. In a low frequency seam welder each of the intervals is equal to a period or more of the low frequency derived from commercial buses through a connector. The timer for a seam welder like the timer of spot welder must necessarily be closely tied up with the frequency converter but the relationship for the former is different than for the latter.

During a seam welding operation, the material may move at a relatively high speed between the electrodes. If the current transmitted during this operation becomes excessively high, a substantial quantity of the material treated may be burned before the improper operation is discovered and the drive for the material stopped. Because of excessively high welding currents, the material to be welded may also adhere to the welding rollers. Under such circumstances the latter must be replaced frequently. If the welding current is too low the material may not be fused at the welds. In a plant where material for automobiles or aircraft is being welded such eventualities are serious catastrophes, particularly in these days of material shortages. Accordingly, in the development of a seam welder of the low frequency type, precautions must be taken to minimize the probability that these eventualities will occur. The timing must be accurate and such phenomena as saturation of the welding must be precluded.

It is, accordingly, an object of our invention to provide a seam welder which shall operate with the welding current at a substantially lower frequency than commercial frequency.

Another object of our invention is to provide apparatus for supplying current of a substantially lower than commercial frequency at discrete intervals to seam weld a material.

A further object of our invention is to provide apparatus for seam welding with alternating current of a substantially lower than commercial frequency without saturating the welding transformer.

An ancillary object of our invention is to provide a novel timer.

Another ancillary object of our invention is to provide a novel electronic timer particularly adapted to cooperate with a frequency converter to produce alternating current pulsations of a substantially lower than commercial frequency.

In accordance with our invention, we provide a seam welder in which the welding current is derived from a frequency converting system controlled from a frequency determining circuit which is in turn controlled from a weld interval timing circuit. The timing circuit turns the frequency determining circuit on and off during accurately timed intervals. During the "on" intervals of the frequency determining circuit, the latter actuates the converter to supply current to the welding transformer repeatedly first in one direction for a predetermined number of periods of the commercial supply and then in the opposite direction for an equal number of periods of the commercial supply. During the "on" interval, current at a substantially lower frequency than the commercial frequency is thus supplied for welding. During the "off" intervals, the frequency determining circuit and the converter are quiescent. The "on-off" timing circuit is so connected to the frequency determining circuit as to assure that the welding current will flow during an equal number of positive and negative half periods of the low frequency.

The novel features that we consider characteristic of our invention are set forth with particularity in the appended claims. The invention itself, however, both as to its organization and its method of operation, together with additional objects and advantages thereof will be understood from the following description of a specific embodiment when read in connection with the accompanying drawings in which, Figures 1, 2 and 3 together constitute a circuit diagram of a preferred embodiment of our invention;

Figure 1:
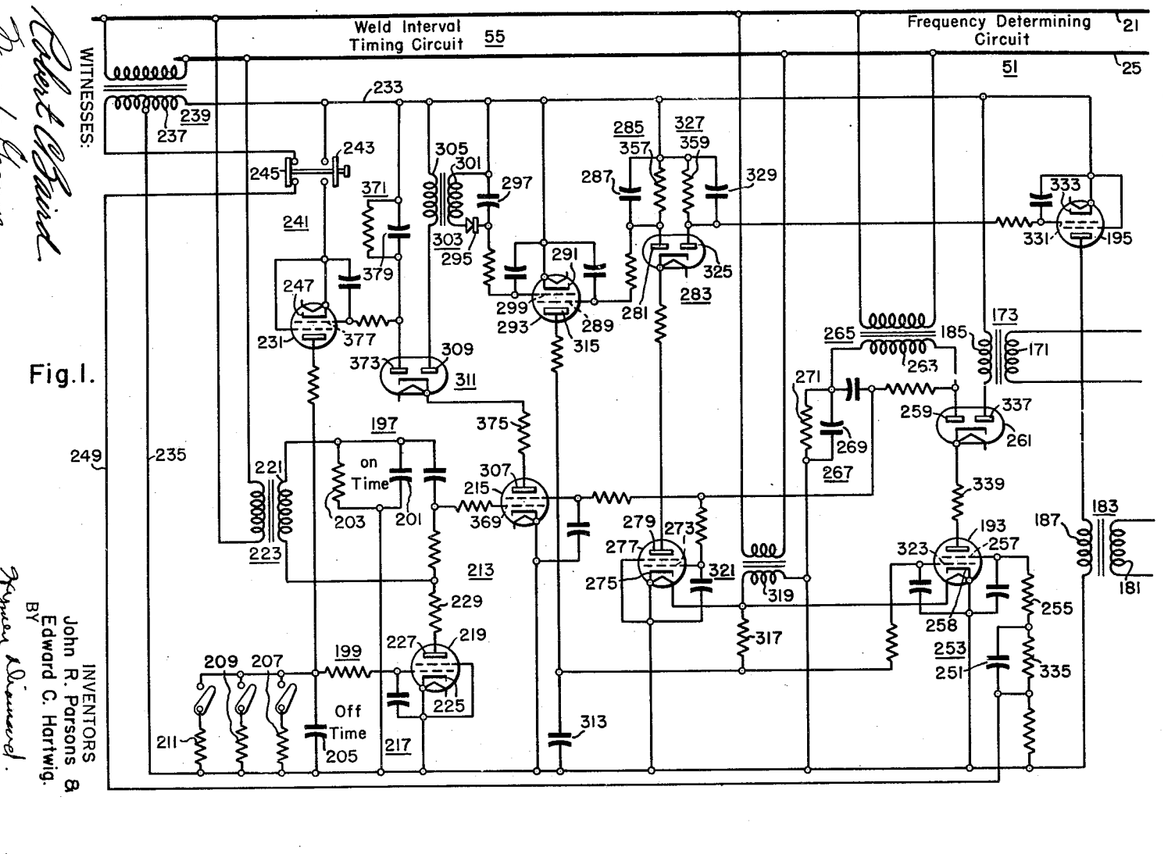
Figure 2:
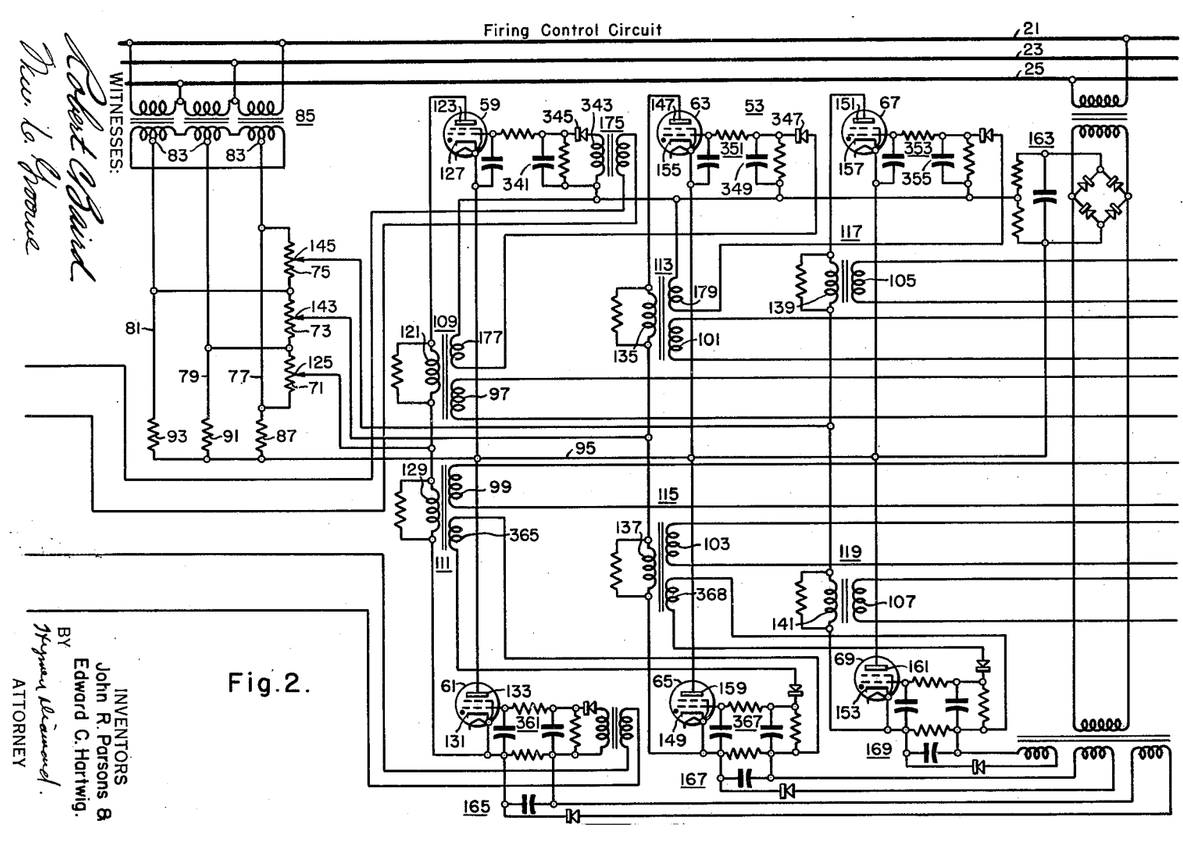
Figure 3:
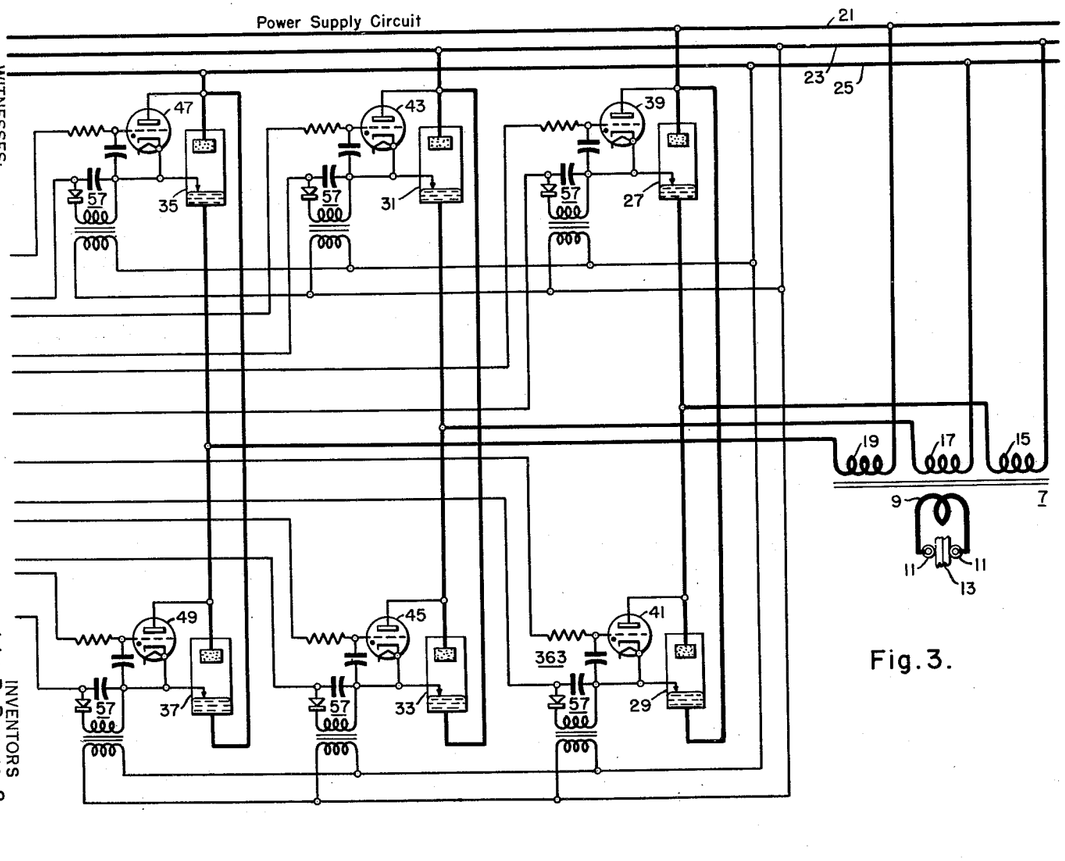

The apparatus shown in Figs. 1 to 3 comprises a welding transformer 7 across the secondary 9 of which a pair of seam welding rollers 11 are connected. The rollers engage the material 13 to be welded as it passes between them and conduct the welding current. The primary of the welding transformer 7 is made up of a plurality of windings 15, 17 and 19.

The transformer 7 derives its power from the buses 21, 23 and 25 of a polyphase supply which is preferably of the commercial 60 cycle type but may be of any other type. Each of the windings 15, 17 and 19 is connected across two of these buses through a pair of ignitrons 27 and 29, 31 and 33, and 35 and 37, respectively, in anti-parallel. For firing each of the ignitrons 27 to 37, a firing thyratron 39, 41, 43, 45, 47 and 49, respectively is provided. The thyratrons 39 to 49 are so controlled that during a predetermined number of half periods of the supply (21, 23, 25), current of one polarity is conducted through each of the primaries 15, 17 and 19 in its turn and during a subsequent number of half periods of the supply, current of the opposite polarity is conducted through each of the primaries in its turn. For controlling the firing thyratrons 39 to 49, we provide frequency determining and firing control circuits 51 and 53, respectively, of such character that the duration and the magnitude of the current of one polarity which flows through the welding transformer 7 is equal to the duration and magnitude of the current of the opposite polarity. A timing circuit 55 is provided for turning the frequency determining circuit on and off.

In the control circuit of each of the firing thyratrons 39 to 49, a network 57 for impressing a biasing potential is provided. This biasing potential may be counteracted by a potential which is derived from a transformer coupled to the anode circuit of a corresponding thyratron 59, 61, 63, 65, 67 and 69 of the firing control circuit 53. These thyratrons 59 to 69 may be subdivided into two groups of three each. One of the groups 59, 63 and 67 controls the firing thyratrons 39, 43 and 47, respectively, associated with the ignitrons 27, 31 and 35, respectively, which conduct current of one polarity and the other 61, 65 and 69 with the firing thyratrons 41, 45 and 49 associated with the ignitrons 29, 33 and 37 which conduct current of the opposite polarity.

The anode circuits of the thyratrons 59 and 61, 63 and 65, 67 and 69 are supplied from rheostats 71, 73 and 75, respectively, connected across auxiliary buses 77 and 79, 79 and 81, and 81 and 77, respectively, which derive their power from intermediate taps 83 of the delta secondary of a transformer 85 supplied from the main buses 21, 23 and 25. The taps 83 are connected each through a resistor 87, 91 and 93 to a neutral bus 95.

Firing potential is supplied to the thyratrons 39 to 49 through the secondaries 97, 99, 101, 103, 105 and 107 of firing transformers 109, 111, 113, 115, 117 and 119, respectively. The primary 121 of the transformer 109 is supplied with current through the thyratron 59 and is connected between the anode 123 of this thyratron and the movable tap 125 of the rheostat 71 from which the thyratron is supplied. The cathode 127 of the thyratron 59 is connected to the neutral bus 95. The primary 129 of the transformer 111 is connected between the tap 125 and the cathode 131 of the thyratron 61; the anode 133 of this thyratron is connected to the bus 95. The primaries 135 and 137 and 139 and 141 of the other pairs of firing transformers 113 and 115 and 117 and 119, respectively, are similarly connected between the taps 143 and 145 of the rheostats 73 and 75, respectively, and the anode 147 of thyratron 67 and the cathode 153 of the thyratron 67. The cathodes 155 and 157 of thyratrons 63 and 67, respectively, and the anodes 159 and 161 of thyratrons 65 and 69 are connected to the neutral bus 95.

In the control circuits of one set of the firing control circuit thyratrons 59, 63, 67 a common biasing network 163 is connected. In the control circuits of the other group of thyratrons 61, 65, 69 separate biasing networks 165, 167 and 169, respectively, are provided. These networks 163, 165, 167 and 169 maintain the thyratrons 59 to 69 non-conductive. The thyratrons 61, 65 and 69 require separate networks because their cathodes 131, 149 and 153 are at the different potentials of the taps 125, 143 and 145 unlike the cathodes 127, 155 and 157 of the other thyratrons.

The bias in the control circuit of one of the firing control circuit thyratrons, the thyratron 59, is counteracted by a potential derived from the secondary 171 of one output transformer 173 of the frequency determining circuit which is transmitted through a grid transformer 175. The output circuit of this thyratron 59 is coupled to the control circuit of a second thyratron 63 of the same group through a secondary 177 of its firing transformer 109 in such manner that when the first thyratron 59 conducts the second thyratron 63, the conductivity of the second thyratron 63 is initiated approximately 5/12 (150°) of a period of the supply after the first thyratron 59 begins to conduct. The output circuit of the second thyratron 63 is coupled through a secondary 179 of the associated firing transformer 113 to the input circuit of the third thyratron 67 of the same group. The coupling is such that when the second thyratron 63 is conductive, the third thyratron 67 conducts during an interval beginning 5/12 of a period after the thyratron 63 begins to conduct. One thyratron 61 of the other group (61, 65, 69) is coupled to the secondary 181 of another output transformer 183 of the frequency determining circuit 51 and is rendered conductive by potential derived therefrom. The other thyratrons 65 and 69 of the same group are coupled to the first thyratron 59 and (59, 63, 67) together in the same manner as the three thyratrons of the first group.

The primaries 185 and 187 of the output transformers 173 and 183, respectively, of the frequency determining circuit 51 are each connected in the anode circuit of an output thyratron 193 and 195, respectively. The conductivity of these thyratrons 193 and 195 is so controlled that the output transformers 173 and 183 are supplied alternately during a predetermined number of half periods corresponding to the desired periodicity of the welding current. The welding current may have a frequency equal to any desired fraction of the supply frequency. However, to simplify the explanation we shall assume that the desired welding current frequency is of the order of 12 cycles per second. To provide current of this frequency each of the output thyratrons 193 and 195 of the frequency determining circuit 51 should conduct in its turn during two periods of the supply and should remain non-conductive during the intervening three periods. Between successive conductive intervals both thyratrons are non-conductive during one period of the supply.

The conductivity of the thyratrons 193 and 195 of the frequency determining circuit is controlled from the weld interval timing circuit 55. The coupling of the timing circuit to the thyratrons of the frequency determining circuit is such that during the "on" intervals, each of the thyratrons of the frequency determining circuit conducts in its turn. During the "off" interval, both thyratrons are non-conductive. The "on" and "off" intervals are timed by time constant networks 197 and 199, respectively. The "on" network includes a capacitor 201 and a resistor 203; the "off" network includes a capacitor 205 and a plurality of resistors 207, 209 and 211 which may be selected in accordance with the desired "off" time interval. The "on" network 197 is connected in the control circuit 213 of the "on" thyratron 215, and the "off" network 199 in the control circuit 217 of the "off" thyratron 219. The "on" network 197 is also connected between a terminal of the secondary 221 of a transformer 223 and the cathode 225 of the "off" thyratron 219; the other terminal of the secondary 221 is connected to the anode 227 of this thyratron through a resistor 229. The "off" network 199 is connected in the anode circuit of a start thyratron 231.

When the start thyratron 231 is conductive, the "off" capacitor 205 is charged and the "off" thyratron 219 is non-conductive. While the "off" thyratron 219 is conductive, the "on" capacitor 201 is charged to maintain the "on" thyratron non-conductive. The "on" interval is in the interval during which the "on" capacitor 201 discharges immediately following the instant when the "off" thyratron 219 is rendered non-conductive. During this "on" interval, the "on" thyratron 215 is non-conductive. The "off" interval is the time interval during which the "off" capacitor 205 discharges following the instant when this interval, the "off" thyratron 219 is non-conductive.

Power is supplied to the start thyratron 231 and, the "on" thyratron 215 and the second output thyratron 195 from auxiliary buses 233 and 235 which are connected between a terminal tap and an intermediate tap of the secondary 237 of a transformer 239 supplied from the main buses 21 and 25. The conductivity of the start thyratron 231 is controlled by a switch 241 having a normally open contact 243 and a normally closed contact 245. When the switch is open, the normally open contact 243 maintains the anode circuit of the start thyratron 231 open between the bus 233 and the cathode 247. Initially, therefore, the "off" capacitor 205 is discharged and the "off" thyratron 219 is conductive. At the normally closed contact 245 of the start switch a control circuit is closed through an auxiliary bus 249 connected to the other terminal of the secondary 237, a biasing capacitor 251 in the control circuit 253 of the output thyratron 193, a grid resistor 255, the screen grid 257 of this thyratron, the cathode 258, to the bus 235. During the half periods when the bus 249 is positive relative to the bus 235, this capacitor 251 is so charged as to maintain the frequency determining thyratron 193 non-conductive.

The thyratron 193 is supplied through one section 259 of a double diode 261 from the secondary 263 of another transformer 265. Between one terminal of this secondary 263 and the bus 235 (cathode 258) a time constant network 267 is connected. When the thyratron 193 is non-conductive the capacitor 269 of this network is discharged through its shunt resistor 271. The network 267 is connected between the control electrode 273 and the cathode 275 of an auxiliary thyratron 277. When the capacitor 269 is discharged this auxiliary thyratron 277 is conductive. The cathode 275 of the thyratron 277 is connected to the bus 235; the anode 279 is connected through a section 281 of double diode 283 and a time constant network 285 to the bus 233. When the thyratron 277 conducts the capacitor 287 of the network 285 is charged. The network 285 is connected between the screen grid 289 and the cathode 291 of another auxiliary thyratron 293 and when the capacitor 287 is charged impresses a biasing potential on this thyratron. This bias may be counteracted by potential impressed through a rectifier 295 on a capacitor 297, between the control grid 299 and the cathode 291, from the secondary 301 of a control transformer 303. The primary 305 of this transformer is connected between the bus 233 and the anode 307 of the "on" thyratron 215 through a section 309 of a double diode 311.

Because the "off" thyratron 219 is initially conductive, the "on" capacitor 201 is charged and the "on" thyratron 215 is initially non-conductive. With the "on" thyratron non-conductive potential is not supplied to the control transformer 303 and the auxiliary thyratron 293 is nonconductive. A capacitor 313 is connected between the anode 315 of the thyratron 293 and the bus 235. This capacitor is shunted by a resistor 317 and the secondary 319 of the heater transformer 321 for the thyratron 193. When the thyratron 293 is non-conductive, the capacitor is discharged. The capacitor 313 is also connected between the control grid 323 and the cathode 258 of the thyratron 193, but initially the thyratron 193 is maintained non-conductive by the biasing capacitor 251 in spite of the fact that the capacitor 313 is discharged.

The anode 279 of the initially conductive auxiliary thyratron 277 is also connected to the bus 233 through the other section 325 of the diode 283 and another time constant network 327. When thyratron 277 conducts the capacitor 329 of this network is also charged. The network 327 is connected between the control electrode 331 and the cathode 333 of the remaining frequency determining output thyratron 195 and maintains the latter non-conductive.

Initially then, potential is not supplied from the output transformers 173 and 183 of the frequency determining circuit 51 and the thyratrons 59 to 69 of the firing control circuit are maintained non-conductive. The firing thyratrons 39 to 49 and their associated ignitrons 27 to 37 are, therefore, also non-conductive.

The operation of the seam welding system shown in Figs. 1 to 3, is initiated, after the electrodes 11 are engaged with the material 13, by actuation of the start switch 241. The normally open contact 243 of the start switch is closed and the start tube 231 is rendered conductive. At the same time, the normally closed contactor 245 of the start switch is opened, the capacitor 251 discharges through a shunt resistor 335 and the output thyratron 193 is rendered conductive. During a predetermined number of positive half periods of the supply, assumed to be two in number for concreteness, current now flows from the bus 233 through the primary 185 of the output transformer 173, one section 337 of a diode 261, a load resistor 339, the thyratron 193 to the bus 235. During each of these two positive half periods, a pulse is transmitted through the output transformer 173 and through the grid transformer 175 of the first thyratron 59 of one of the groups of thyratrons of the firing control circuit. A capacitor 341 connected to the secondary 343 of the transformer is charged through a rectifier 345 in such a sense as to counteract the bias impressed on the thyratron and the thyratron 59 is rendered conductive. Current is now conducted from the adjustable tap 25 through the primary 121 of the firing transformer 109, the thyratron 59 to the neutral bus 95. Through a secondary 97 of the firing transformer 109 firing potential is impressed in the control circuit of the firing thyratron 39 for one of the ignitrons 27. The associated ignitron is rendered conductive and current flows from one of the three-phase buses 21 through the ignitron 27, one of the primaries 15 of the welding transformer 7 to another bus 23. Through another secondary winding 177 of the firing transformer 109, a potential is impressed through a rectifer 347 across a capacitor 349 in the control circuit 351 of the second thyratron 63 of the group through a rectifier. This capacitor 349 is charged and the bias impressed on this second thyratron 63 is counteracted so that the thyratron is rendered conductive. Current now flows from the second adjustable tap 143 through the primary 135 of a second firing transformer 113, the second thyratron 63 to the neutral bus 95. This current flows with a phase delay of approximately 150° following the initiation of current flow through the first thyratron 59. Through a secondary winding 101 of the second firing transformer 113 potential is induced in a control circuit of the second firing thyratron 43 to render the latter and its associated ignitron 31 conductive. Current now flows from a bus 23 through the last-mentioned ignitron 31, an associated primary 17 of the welding transformer 7 to another bus 25. Through the other winding 179 of the second firing transformer 113 potential is impressed in the control circuit 353 of the third thyratron 67 of the group to charge a capacitor 355 in its control circuit and render it conductive. Current then flows from the third adjustable tap 145 through the primary 13 of the third firing transformer 117, the thyratron 67 to the neutral 95. This current flows at a phase delay of approximately 150° following the initiation of current flow through the second thyratron 63. Through the secondary 105 of the third firing transformer potential is now impressed to render the third firing thyratron 47 conductive and current flows through the associated ignitron 35 and through the third primary winding 19 of the welding transformer 7.

The above-described sequence of operations is initiated by the flow of current through the thyratron of the frequency determining circuit during one half period of the supply and takes place during a full period of the supply. During the succeeding positive half period of the supply, the output thyratron 193 again conducts, a second potential pulsation is now again impressed in the first 59 of the groups of thyratrons 59, 63, 67 of the firing control circuit and the above-described operation is repeated, the ignitrons again being rendered conductive in succession and current being supplied in succession to the primary windings 15, 17 and 19 respectively of the welding transformer 7. When the third ignitron 35 has conducted for the second time, six current pulses have been transmitted through the successive windings 15 to 19 of the welding transformer and current of substantial magnitude has been built up in the secondary 9 of the transformer.

While the output thyratron 193 is conductive, it conducts current through a branch circuit extending from one terminal of the auxiliary secondary 263, the other section 259 of the diode 261, the thyratron 193, the time constant network 267 to the other terminal of the secondary. The capacitor 269 of this time constant network is charged and the first auxiliary thyratron 277 is rendered non-conductive. The charging of the capacitors 287 and 329 of the two time constant networks 285 and 327, respectively, connected to this auxiliary thyratron 277 is, therefore, interrupted. Both capacitors 287 and 329 now discharge through their associated resistors 357 and 359, respectively. The resistor 357 of the network 285 is so selected that the network 285 reaches a potential at which the second auxiliary thyratron 293 is rendered conductive approximately at the end of the second conductive half period of the first output thyratron 193 of the frequency determining circuit 51, and the resistor 359 of the other network 327 is so selected that the other output thyratron 195 is rendered conductive one period of the supply after this auxiliary thyratron 293 is rendered conductive. When the second auxiliary thyratron 293 conducts the capacitor 313 in its anode circuit is charged. The first output thyratron 193, therefore, fails to conduct during the first positive half period following the instant when the auxiliary thyratron 293 is rendered conductive; at this time the other output thyratron 195 is also non-conductive.

One full period after the end of the second conductive half period of the first thyratron 193, the second output thyratron 195 of the frequency determining circuit is rendered conductive. Current now flows through this thyratron and through the primary 105 of the second output transformer 173. Potential is now impressed in the control circuit 361 of the first thyratron 61 of the second group 61, 65, 69 to render the latter conductive. Current is conducted through the primary 129 of the associated firing transformer 111 and firing potential is impressed in the control circuit 363 of the associated firing thyratron 41 firing the thyratron and its associated ignitron 29. Current now flows from the bus 23 through the primary winding 15 of the welding transformer 7, the ignitron 29 to another bus 21. This current is of a polarity opposite to the polarity of the first six current pulses. The firing transformer 111 is provided with another secondary winding 365 through which a firing potential is impressed in the control circuit 367 of the second thyratron 65 of the group and the latter is fired at a 150° phase delay after the first thyratron. An associated ignitron 33 is now fired and current is transmitted through another primary 17 of the welding transformer 7 in a direction opposite to the direction of the first six current pulses. The third thyratron 69 of the group 61, 65, 69 is rendered conductive from a secondary winding 368 of the second firing transformer 115 in its turn and an associated ignitron 37 is rendered conductive. Current then flows through the third winding 19 of the transformer 7. This current is of the same polarity as the current flow through the other windings 15 and 17 just described. The second output thyratron 195 is now rendered conductive during a succeeding positive half period of the supply and the above sequence is again repeated so that six pulses of current of a polarity opposite to the polarity of the first six pulses is transmitted through the primaries 15, 17, 19 of the welding transformer 7.

While the second output thyratron 195 of the frequency determining circuit 51 is conducting, the capacitor 269 of the time constant network 267 in the anode circuit of the first thyratron 193 is discharging. After the second thyratron 195 has conducted during the positive half periods for two full cycles of the supply this capacitor discharges to a potential at which the first auxiliary thyratron 277 is rendered conductive. Current now flows through this thyratron to charge the capacitors 287 and 329 of the time constant networks in its anode circuit. The second output thyratron 195 of the frequency determining circuit is now rendered non-conductive. The second auxiliary thyratron 293 is also immediately rendered non-conductive and the flow of charging current to the capacitor 113 in the control circuit 323—258 of the first output thyratron 193 is interrupted. This capacitor is discharged through the resistor 317 and the secondary winding 319 of the heater transformer 321. The discharge resistance is so selected that the first thyratron 193 becomes conductive one full cycle after the end of the second conductive half period of the second thyratron 195. The first thyratron now conducts during two full half periods while the second thyratron 195 is non-conductive, and another six pulses of current of the first polarity are transmitted through the welding transformer 7. After the first thyratron 193 has conducted for two full periods, the second thyratron is again rendered conductive and the above-described sequence of operation is repeated. The first and second thyratrons thus continue to conduct and current of a frequency substantially lower than the supply frequency flows through the material 13 to be welded.

While the output thyratrons 193 and 195 of the frequency determining circuit 51 are conducting, the weld interval timing circuit 55 is also in operation. Current is conducted through the start thyratron 231, the "off" capacitor 205 is charged and the "off" thyratron is immediately rendered non-conductive. The flow of charging current to the "on" capacitor 201 is interrupted and the "on" capacitor discharges through the "on" resistor 203. This discharging operation continues for a predetermined time interval and so long as it continues the "on" thyratron 215 remains nonconductive. The frequency determining circuit 51 is not, for the time being, affected by the "on" thyratron.

When the "on" capacitor 201 has discharged for a predetermined time interval, it reaches a potential at which the "on" thyratron 215 may be rendered conductive. However, the screen grid 369 of the "on" thyratron 215 is connected to the time constant network 267 in the anode circuit of the first output thyratron 193 of the frequency determining circuit 51 and so long as the first thyratron 193 is conductive, the "on" thyratron 215 is maintained non-conductive in spite of the fact that the "on" capacitor 201 is discharged. When the "on" capacitor 201 is discharged and the first thyratron becomes non-conductive, the "on" thyratron 215 becomes conductive after the capacitor 269 of the network 267 properly discharges through its associated resistor 271. This latter event occurs when the first auxiliary thyratron 277 becomes conductive, that is just after the second output thyratron has conducted during two successive half periods of the supply completing a full cycle of the low frequency. Current now flows from the bus 233 through a time constant network 371, the remaining section 373 of the double diode 311, a resistor 375, the "on" thyratron 215 to the bus 235. This time constant network 371 is connected between the control electrode 377 and the cathode 247 of the start thyratron 231. The latter is immediately rendered non-conductive and the charging current to the "off" capacitor 205 is interrupted; the "off" capacitor discharges through one of its associated resistors 207, 209, 211. Until it is discharged to the proper potential, the "off" thyratron 219 remains non-conductive.

When the "on" thyratron 215 is conductive, current also flows through the branch circuit including the primary 305 of a control transformer 303. The second auxiliary thyratron 293 is, therefore, rendered conductive, in spite of the fact that the capacitor 287 of the network 285 is now charged, and the capacitor 313 in the control circuit of the first output thyratron 193 of the frequency determining circuit 51 is charged. The first thyratron 193 is now maintained non-conductive so long as the capacitor 113 continues to be charged. Since this thyratron is non-conductive, the auxiliary thyratron 277 remains conductive and the second output thyratron 195 remains non-conductive. After the frequency determining circuit 51 has completed its last full cycle of operation and the last full cycle of the low-frequency has been transmitted through the transformer 7, the circuit 51 now remains quiescent.

The above-described condition continues until the "off" capacitor 205 discharges through its associated resistor 207, 209, 211 to a potential at which the "off" thyratron 219 is rendered conductive. The "on" capacitor 201 is now charged and the "on" thyratron is immediately rendered non-conductive. Current flow through the control transformer 303, therefore, stops and the first auxiliary thyratron 293 becomes non-conductive. Thereafter, the capacitor 313 in the control circuit 323—258 of the first output thyratron 193 discharges and this thyratron is rendered conductive initiating a second welding operation. When the "on" thyratron 215 becomes non-conductive, the charging current to the capacitor 379 of the network 371 in the control circuit of the start thyratron 231 is interrupted, the latter, therefore, becomes conductive and the "off" capacitor 205 is charged to render the "off" thyratron 219 non-conductive. The second welding operation now in progress continues until the "on" thyratron 215 again becomes conductive.

Figure 5:
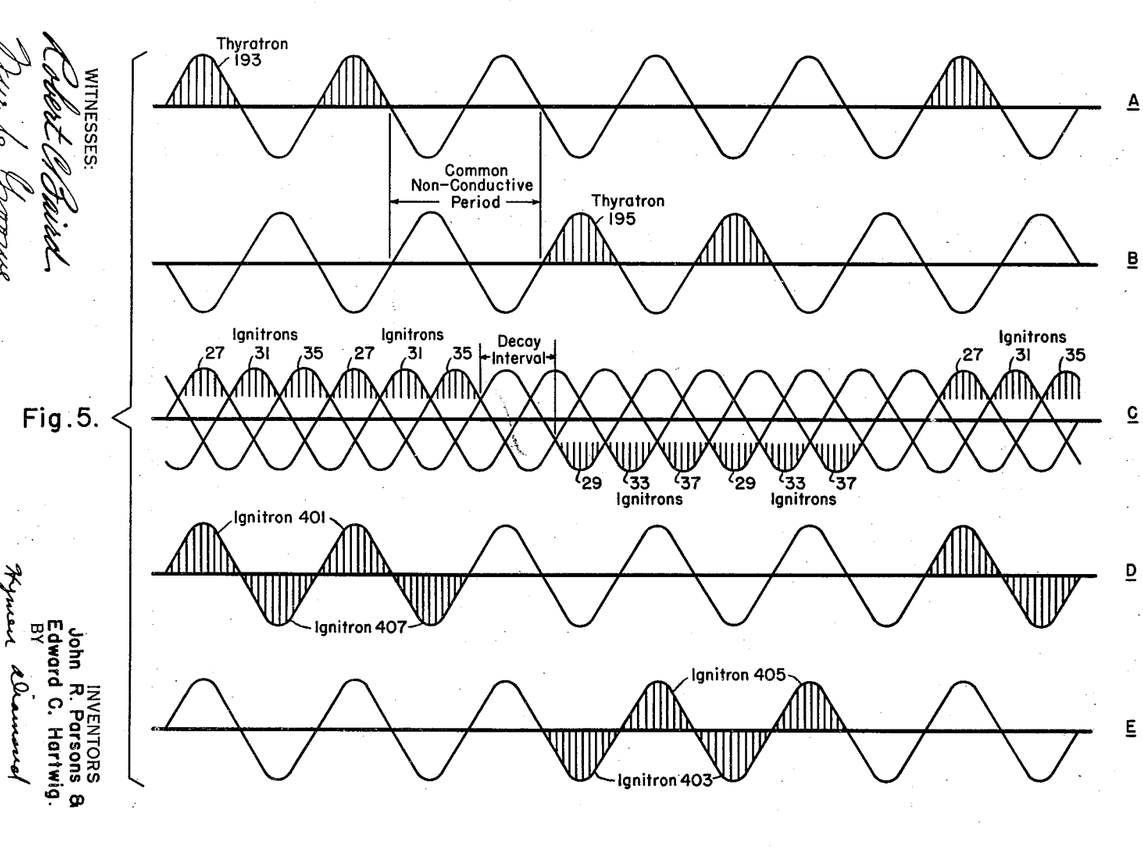
Fig. 5 is a graph illustrating the operation of the apparatus shown in Figures 1 to 4.

The operation of the seam welder shown in Figs. 1, 2 and 3, during an active interval is illustrated graphically by plots A, B and C of Fig. 5. In this figure, voltage is plotted vertically and timing horizontally. The shaded areas represent half periods or 150° intervals during which tubes are conductive. Curve A illustrates the operation of the first frequency determining output thyratron 193, curve B that of the second frequency determining output thyratron 195 and curve C the operation of the associated ignitrons 27 to 37. The various shaded areas are labelled "Ignitron" followed by a number or "Thyratron" followed by a number to correspond to the ignitron or thyratron which is conductive during the corresponding interval.

The first output thyratron 193 is shown to be conductive during the first half period. Through the firing control circuit, the associated three ignitrons 27, 31 and 35 are rendered conductive in succession as shown. During the succeeding positive half period the first thyratron 139 is again rendered conductive and the associated ignitrons again conduct. At the end of the second full period following the initiation of the conductivity of the first thyratron, each of the associated ignitrons have conducted two current pulses, a total of six being conducted through the transformer. The first thyratron 193 now remains non-conductive for three full periods (not including the first negative half period following the last conductive positive half period). The second frequency determining output thyratron 195 is now rendered conductive one full period after the instant when the conductivity of the first thyratron stops (as shown in curve B). During this period, the potential across the phase conductors 21 and 23 between which current is conducted initially during the first conductive interval is at a maximum but of opposite polarity to the initial potential. The ignitron 29 connected in anti-parallel with the first 27 of the three ignitrons to conduct, therefore, becomes conductive. The other ignitrons 33 and 37 in the same group are conductive in succession following the conductivity of this first ignitron; each of the other ignitrons 33 and 37 conducting in the same order as the ignitron 31 and 35 respectively to which it is connected in anti-parallel. The second thyratron 195 also conducts during a second positive half period again rendering its associated ignitrons 29, 33 and 37 each in its turn. After this conductive half period, the second thyratron is maintained non-conductive for three full periods during which the first thyratron conducts. During the full period during which both thyratrons 193 and 195 are non-conductive, the flux built up in the welding transformer by the current flow in one direction is permitted to decay. Approximately one half period is available for the decay to be completed.

Figure 4:
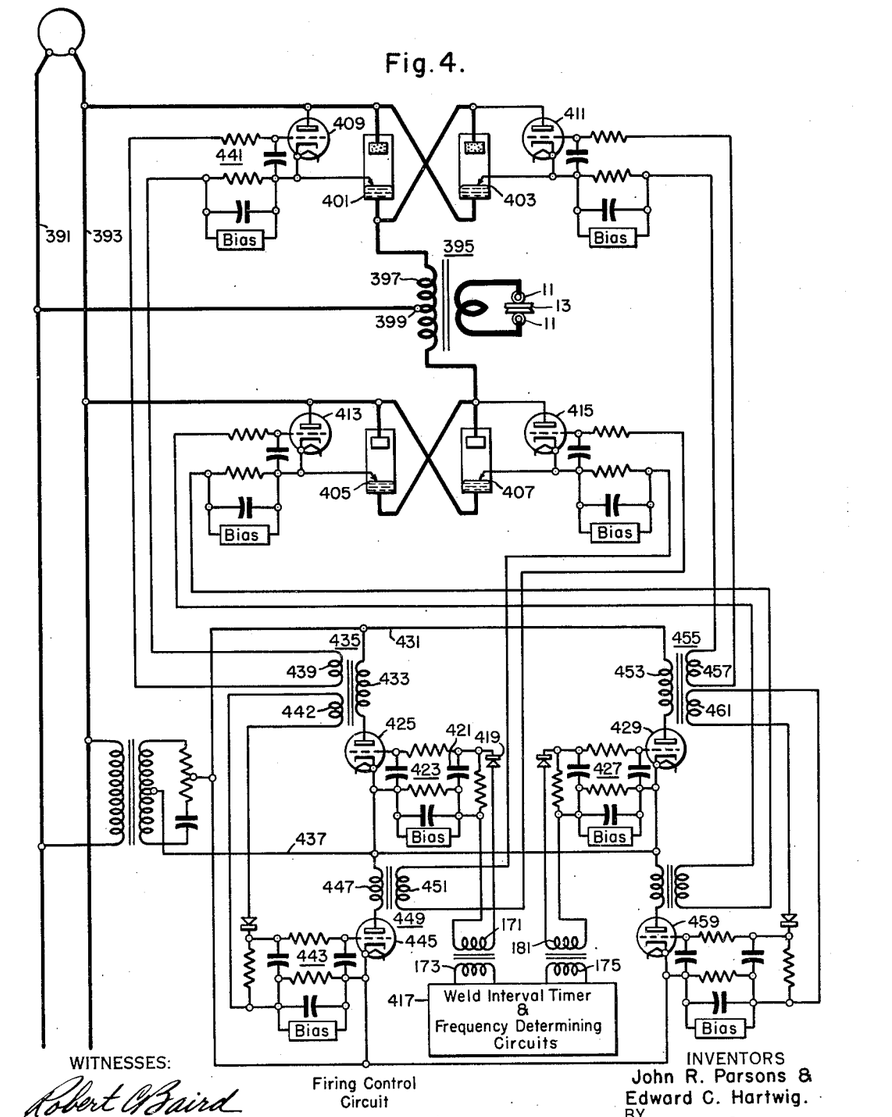
Fig. 4 is a circuit diagram showing a modification of our invention.

In Fig. 4, a low frequency seam welding system which derives its power from single phase buses 391 and 393 is shown. In this system, the welding transformer 395 is of the type having a primary 397 with an intermediate tap 399. This tap is connected to one of the power supply buses 391. One of the terminals of the primary 397 is connected to the other bus 393 through a pair of ignitrons 401 and 403 in anti-parallel. The other terminal is also connected to the same bus 393 through another pair of anti-parallel ignitrons 405 and 407. Each of the ignitrons 401, 403, 405 and 407 is provided with a firing thyratron 409, 411, 413 and 415 respectively which is controlled from a firing control circuit. The firing control circuit is supplied from a weld interval timing circuit and a frequency determining circuit represented in Fig. 4 by a block 417 and identical to that shown in Fig. 1.

The secondary 171 of one of the output transformers 173 of the frequency determining circuit is connected through a rectifier 419 across a capacitor 421 in the control circuit 423 of a thyratron 425 of the firing control circuit. A secondary 175 of the other control transformer 183 is similarly connected in the control circuit 427 of another thyratron 429. During the intervals when the frequency determining circuit is activated, potential pulses are impressed during two successive positive half periods of the supply at intervals of three periods of the supply alternatively in the control circuits 423 and 427 of each of the thyratrons 425 and 429, respectively. When the first pulse is impressed in the control circuit 423 of the first thyratron 425, the latter is rendered conductive and current flows from an auxiliary line conductor 431 through the primary 433 of a firing transformer 435, the thyratron 425 to another line conductor 437. The operation of the circuits 417 is so timed that when thyratron 425 is conductive bus 393 is positive and bus 391 negative. Through one secondary 439 of the transformer 435 firing potential is impressed in the control circuit 441 of a firing thyratron 409 and the associated ignitron 401 is rendered conductive. Current flows from the now positive bus 393 through the ignitron 401 downward through the upper half of the primary 397 of the welding transformer 395 to the other bus 391. Through another secondary 442 a potential is impressed in the control circuit 443 of a second thyratron 445 to render the latter conductive during the succeeding half period of the supply potential. This latter thyratron conducts current from the bus 437 through the primary 447 of a firing transformer 449, the thyratron to the other bus 431. Through the secondary 451 of this firing transformer 449, the firing thyratron 415 for another ignitron 407 is rendered conductive. The ignitron now conducts current from the now positive bus 391 of the supply, downward through the lower half of the primary 397 of the welding transformer, through the ignitron 407 to the remaining bus 393. During the succeeding half period of the supply, the first thyratron 425 is again rendered conductive firing the associated ignitron 401 during one half period, and the second thyratron 445 is rendered conductive firing its associated ignitron 407 during the succeeding half period.

One full period after the instant when the current flow through the first output transformer 173 stops the second output transformer 175 is energized. The thyratron 429 controlled from this transformer is now rendered conductive, conducting current through the primary 453 a firing transformer 455. Through one secondary 457 of this transformer potential is impressed to render the firing thyratron 411 of an associated ignitron 403 conductive. Current now flows from a now positive bus 391, upward through the upper half of the welding transformer primary 397, the ignitron 403 to the now negative bus 393. Potential is impressed to render a thyratron 459 associated with the last conductive thyratron 429 conductive through another secondary 461 of the firing transformer. The latter thyratron is rendered conductive during the succeeding half period and its associated ignitron 405 is rendered conductive during this half period. Current now flows from the now positive bus 393, through the ignitron 405, upward through the lower half of the primary 397 of the welding transformer to the now negative bus 391. The last-described process is repeated during another period of the supply when a second potential pulse is impressed through the second output transformer 175. Thereafter current is again conducted downward through the primary when ignitrons 401 and 407 are conductive. Current is thus supplied for seam welding during the selected welding intervals at a frequency equal approximately to 15 cycles per second. This frequency is substantially lower than commercial frequency and in many respects mentioned in the above specified applications has numerous advantages.

The operation of the system shown in Fig. 4 is illustrated in curves A, B, D and E of Fig. 5. Curve D illustrates the operation of one set of the valves and curve E the operation of the other set of valves. As shown, each of the first set of ignitrons 401 and 407 is conductive in its turn during the two periods during which the first frequency determining thyratron 193 is conductive. Thereafter, none of the ignitrons is conductive during a half period. During this interval, the flux in the welding transformer 395 decays. After this half period, the second frequency determining thyratron 195 becomes conductive and the other ignitrons 403 and 405 are rendered conductive to conduct current of the opposite polarity through the primaries of the welding transformer. Another non-conductive half period follows the last half period during which current is conducted through the primary 397 of the welding transformer 395.

While we have shown and described certain specific objects of our invention, we are fully aware that many modifications thereof are possible. Our invention, therefore, is not to be restricted except insofar as necessitated by the prior art and by the spirit of the appended claims.

We claim as our invention:

1. In combination an electric discharge device having a pair of principal electrodes and first and second control electrodes; a timer connected to said first control electrode for supplying thereto a first potential during predetermined "on" time intervals and a second potential during predetermined "off" time intervals, and a second timer connected to said second control electrode for supplying to said second electrode, during said "on" intervals, a third potential during predetermined first sub-time intervals and a fourth potential during predetermined second sub-time intervals.

2. In combination an electric discharge device having a pair of principal electrodes and first and second control electrodes; a timer connected to said first control electrode for supplying thereto a first potential during predetermined "on" time intervals and a second potential during predetermined "off" time intervals; a second timer connected to said second control electrode for supplying to said second electrode, during said "on" intervals, a third potential during predetermined first sub-time intervals and a fourth potential during predetermined second sub-time intervals and connections between said second timer and said first timer for preventing the supply of said second potential to said first control electrode during said first sub-time intervals.

3. In combination, an electric discharge device having a pair of principal electrodes and first and second control electrodes; a timer connected to said first control electrode for supplying thereto a first potential during predetermined "on" time intervals and a second potential during predetermined "off" time intervals; said first timer including a second electric discharge device having a pair of principal electrodes and first and second control electrodes, said last-named principal electrodes being coupled to said first control electrode of said first-named discharge device to supply said first and second potentials thereto and said first control electrode of said second discharge device being connected to control the supply of said first and second potentials to said first control electrode of said first-named discharge device; a second timer connected to said second control electrode for supplying to said second electrode, during said "on" intervals, a third potential during predetermined first sub-time intervals and a fourth potential during predetermined second sub-time intervals, and connections between said second timer and said second control electrode of said second discharge device for preventing the supply of said second potential to said first control electrode during said first sub-time intervals.

4. In combination, a first electric discharge device having a pair of principal electrodes and a control electrode; connections to said control electrode for controlling the conductivity of said discharge device; a first network including a first control component and a second electric discharge device having a pair of principal electrodes, connected in series with the principal electrodes of said first discharge device; a second network including a second control component and a third electric discharge device having a pair of principal electrodes, connected in parallel with said first network; a fourth electric discharge device having a pair of principal electrodes and a control electrode; connections between said last-named control electrode and said first control component for rendering said fourth discharge device conductive when said first discharge device is conductive; a fifth electric discharge device having a pair of principal electrodes and a control electrode; and connections between said last-named control electrode, and said second control component for rendering said fifth discharge device non-conductive when said first discharge device is conductive.

5. The combination according to claim 4 characterized by the fact that the first control component is a transformer and the second control component a time constant network.

JOHN R. PARSONS.
EDWARD C. HARTWIG.

No references cited.